United States Patent [19]
Allen et al.

[11] Patent Number: 4,893,389
[45] Date of Patent: Jan. 16, 1990

[54] REINSTATEMENT OF LATERAL BRANCH CONNECTIONS IN RELINED SEWERS OR PIPES

[76] Inventors: Peter Allen; Sydney Molyneux, both of P.O. Box 226, Brisbane Markets, QLD, 4106, Australia

[21] Appl. No.: 272,803
[22] PCT Filed: Mar. 25, 1987
[86] PCT No.: PCT/AU87/00081
  § 371 Date: Sep. 30, 1988
  § 102(e) Date: Sep. 30, 1988
[87] PCT Pub. No.: WO87/05984
  PCT Pub. Date: Oct. 8, 1987

[30] Foreign Application Priority Data

Mar. 25, 1986 [AU] Australia ................ PH5195

[51] Int. Cl.[4] .................................... B21D 53/00
[52] U.S. Cl. ...................... 29/157 T; 29/402.09; 29/402.18; 29/527.2
[58] Field of Search ........... 29/157 T, 157 R, 402.09, 29/402.18, 460, 527.2, 530; 138/97, 89; 137/15; 156/250, 294, 94; 427/140

[56] References Cited

U.S. PATENT DOCUMENTS

| 4,321,740 | 3/1982 | Davis et al. ............ 29/402.09 |
| 4,377,896 | 3/1983 | Cox ....................... 29/157 R |
| 4,394,202 | 7/1983 | Thomas et al. .......... 29/402.09 |
| 4,397,890 | 8/1983 | Kinumoto et al. ........... 138/97 |
| 4,410,391 | 10/1983 | Thomas et al. ............. 138/97 |
| 4,678,370 | 7/1987 | Allen ........................ 138/97 |
| 4,728,223 | 3/1988 | Rice ........................ 138/97 |
| 4,767,236 | 8/1988 | Rice ..................... 29/402.09 |

FOREIGN PATENT DOCUMENTS

| 264172 | 10/1963 | Australia . |
| 0063919 | 11/1982 | European Pat. Off. . |
| WO82/04086 | 11/1982 | PCT Int'l Appl. . |
| WO86/05569 | 9/1986 | PCT Int'l Appl. . |
| 1039836 | 8/1966 | United Kingdom . |
| 1261952 | 2/1972 | United Kingdom . |
| 2041147 | 9/1980 | United Kingdom . |

OTHER PUBLICATIONS

"Salvaging a Broken-Down Sewer", Engineering News Record, Nov. 19, 1959, pp. 98-99.

*Primary Examiner*—P. W. Echols
*Assistant Examiner*—Irene Cuda
*Attorney, Agent, or Firm*—Foley & Lardner, Schwartz, Jeffery, Schwaab, Mack, Blumenthal & Evans

[57] ABSTRACT

A method for reinstating branch lines to main sewers or pipes which have been relined is used in which inflatable plug seals the branch line and grout is injected via an injection pipe to fill the cavity at the junction around the liner. When the grout has initially set the inflatable plug is withdrawn and a pilot hole is cut through the grout and liner by a cutting tool fed down the branch line on a flexible drive. A reaming tool, attached to the flexible drive is drawn from within the liner towards the branch line to open up the pilot hole to fully open the connection between the main sewer or pipe and the branch line.

5 Claims, 3 Drawing Sheets

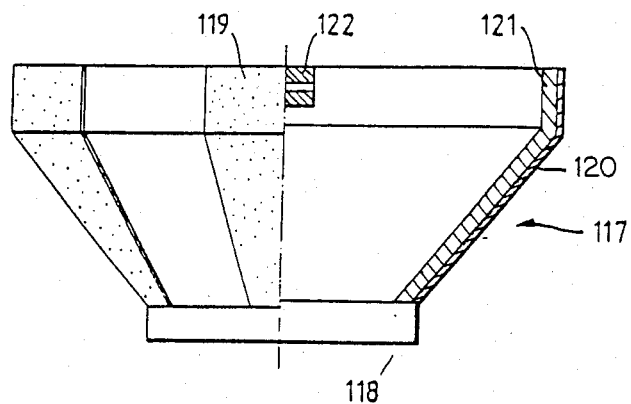
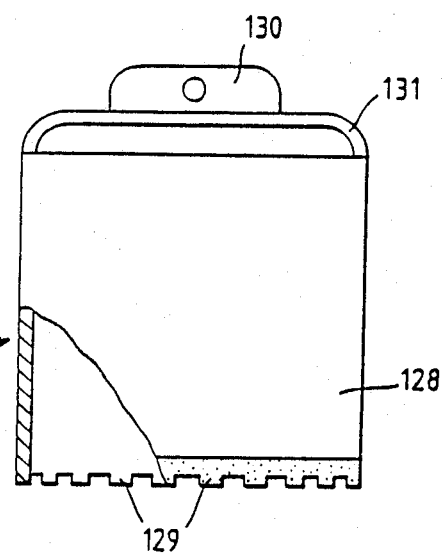
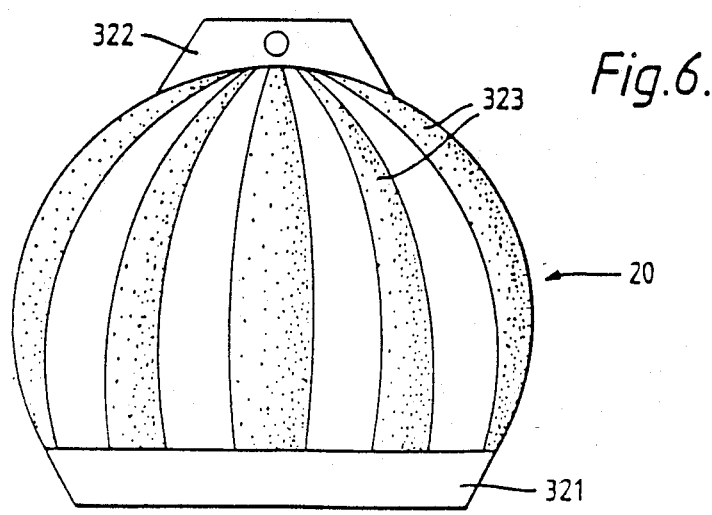

REINSTATEMENT OF LATERAL BRANCH CONNECTIONS IN RELINED SEWERS OR PIPES

BACKGROUND OF THE INVENTION (1) Field of the Invention

This invention relates to methods for reinstatement of lateral branch connections in relined sewers or pipes.

(2) Prior Art

Patent Specification AU-B42585/85 (558128) and EP 0184366, both by Danby Pty. Ltd., disclose a method for relining sewers and pipes where a PVC liner strip is wound to form a tubular liner in a continuous length in the sewer, the liner is pressurized and grout is pumped into the cavity between the liner and the sewer wall and allowed to set.

This method is particularly successful for relining damaged or corroded sewers, the lateral branch lines to the sewers are closed off and must be reinstated (i.e. reconnected) to the relined sewer.

SUMMARY OF THE PRESENT INVENTION

It is an object of the present invention to provide a method for the reinstatement of the lateral branches to the relined sewer or pipe.

It is a preferred object that the method be relatively simple and inexpensive.

It is a further preferred object that the method be effected during the relining of the main sewer or pipe.

Other preferred objects of the present invention will become apparent from the following description.

In one aspect the present invention resides in a method for the reinstatement of lateral branch connections in relined sewers or pipes including the steps of:

sealing the connection of the lateral branch to the sewer or pipe before a liner has been grouted in the sewer or pipe;

removing the seal after the liner has been grouted in the sewer or pipe at the connection and the grout has at least initially set;

cutting out a pilot hole, aligned with the lateral banch, through the grout and the liner in the sewer or pipe with a first cutting tool fed down the lateral branch; and cutting out the grout and the liner with a second cutting tool, fed towards the lateral branch from the sewer or pipe, to open the pilot hole to substantially the diameter of the lateral branch to reinstate the connection.

Preferably the branch line is sealed from the main sewer or pipe by inserting an inflatable plug down the branch to the top of the PVC liner in the sewer or pipe before the grout is pumped into the sewer or pipe. Preferably grout is pumped through a hollow rod placed down the branch to seal the junction of the branch with the sewer and is allowed to set (the inflatable plug then being removed).

In a second aspect the present invention resides in a method for the reinstatement of lateral branch connections in relined sewers or pipes including the steps of:

after a liner has been positioned in the sewer or pipe, but before the liner is grouted in the sewer or pipe, cutting a pilot hole, aligned with the lateral branch, through the liner with a first cutting tool fed down the lateral branch;

sealing the pilot hole to the lateral branch;

removing the seal after the liner has been grouted in the sewer or pipe at the connection and the grout has at least initially set; and cutting out the grout and the liner with a second cutting tool, fed towards the lateral branch from the sewer or pipe, to open the pilot hole to substantially the diameter of the lateral branch to reinstate the connection.

Preferably the branch line and the pilot hole are sealed by an inflatable plug down the branch line. Preferably the grout is pumped into the cavity between the liner and the sewer wall from the nearest manhole to fill the cavity. The inflatable plug is preferably removed when the grout has initially set.

In a third aspect the present invention resides in the apparatus for effecting the method.

BRIEF DESCRIPTION OF THE DRAWINGS

To enable the invention to be fully understood, a number of preferred embodiments will now be described with reference to the accompanying drawings, in which:

FIG. 4 is a part-sectional view of a cutting tool suitable for cutting the pilot hole;

FIG. 5 is a part-sectional view of an alternative cutting tool for the pilot hole;

FIG. 6 is a side view of a reaming tool;

DETAILED DESCRIPTION OF THE PREFERRED EMBODIMENTS

Figure 1:
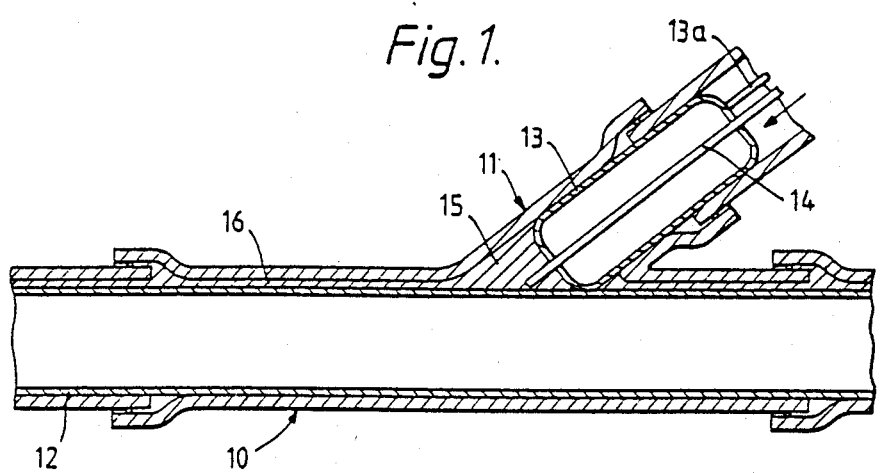
FIG. 1 is a sectional side view of the main sewer and lateral branch line after the liner has been grouted in position in the first preferred method of the present invention.
Figure 2:
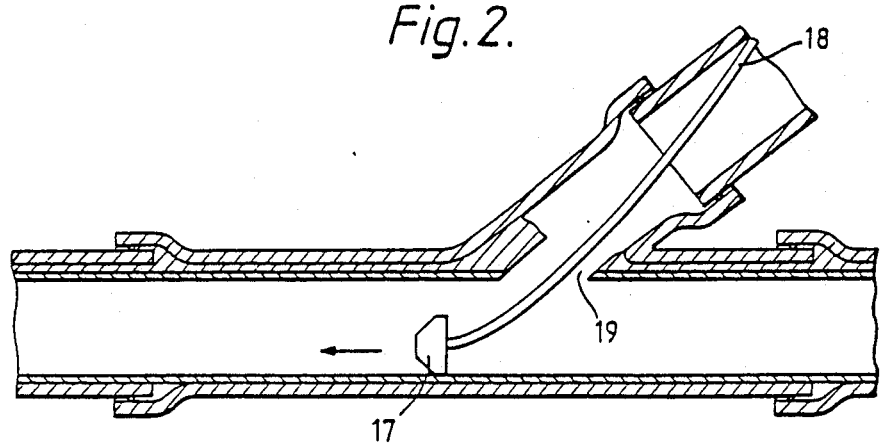
FIG. 2 is a similar view showing the cutting of the pilot hole.
Figure 3:
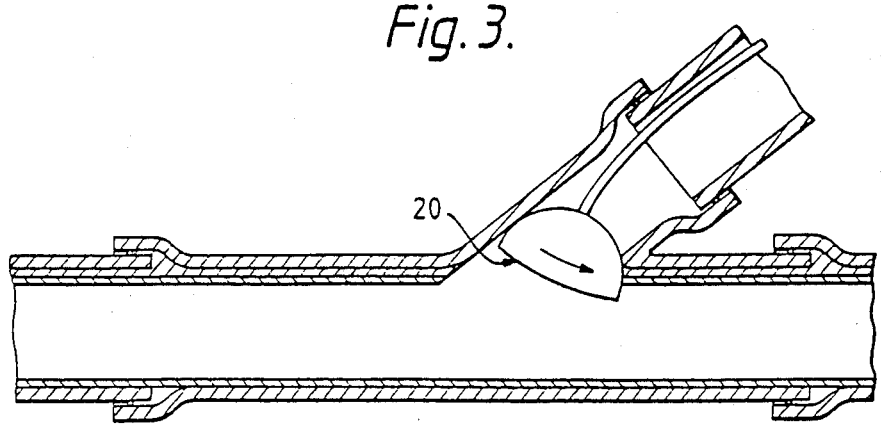
FIG. 3 is a similar view of the reaming out of the connection between the main sewer and the branch line.

Referring to the first embodiment of FIGS. 1 to 3, the main sewer 10 has a lateral branch 11. The main sewer is to be relined with a liner 12 formed of a continuous PVC strip as described in AU-B42585/85 and EP 0184366 discussed above.

An inflatable plug 13 is fed down the branch line 11 to the junction with the main sewer 10 and is inflated via a pipe 13a. Grout is pumped down a grout injection rod 14 to fill the space around the liner at the branch connection to form a seal 15.

Grout 16 is then pumped to fill the cavity between the liner 12 and the main sewer wall, the grout being injected into the main sewer at the nearest manhole by the method described in EP 0184366.

When the grout has at least initially set, the inflatable plug 13 is deflated and removed.

A diamond tipped cutting tool 17 e.g. of 50–75 mm diameter, is passed down the branch line 11 on a flexible drive shaft 18 to cut a pilot hole 19 through the liner 12 and grout 15 at the junction of the main sewer 10 and branch line 11.

The flexible drive 18 is extended down the branch line until the cutting tool 17 reaches the nearest manhole.

The cutting tool 17 is removed and replaced by the reaming tool 20. The next day, the flexible drive is withdrawn until the reaming tool 20 reaches the junction. The flexible drive 18 is driven and further withdrawn to cause the reaming tool to remove the grout 15 at the junction and open up the pilot hole 19 to form a full diameter connection between the main sewer 10 and branch line 11, thereby reinstating the branch.

It will be readily apparent to the skilled addressee that where a number of branch lines 11 are connected to the main sewer 10 between a pair of manholes, each branch line will be sealed and grouted as shown in FIG. 1 before the grout 16 is pumped into the cavity between the liner 12 and the main sewer 10.

Referring to FIG. 4, a cutting tool 117 suitable for cutting the pilot holes 19 in right-angled branch lines 11, or those with bends, is shown. The tool is substantially frusto-conical in shape and has a cutting ring 118 coated with industrial diamonds 119, at its nose to cut a small pilot hole. The conical body 120 has bands 119 of industrial diamonds which open up the pilot hole to the diameter of the tail ring 121. The flexible drive 18 is connected to a diametrical mounting bar 122 fixed to the tail ring 121.

For angled branch lines 11, the cutting tool 217 shown in FIG. 5 may be used. This tool, similar to a hole-sewer, has a tubular body 128 with diamondtipped teeth 129. The flexible drive 18 is connected to a mounting plate 130 provided in a diametrical mounting bar 131.

The reaming tool 20, shown in FIG. 6, has a solid "bell-shape" body 321 which has a mounting plate 322 for the flexible drive 18. Bands of industrial diamonds 323 are provided on the exterior of the body to grind through the grout 15 at the junction to open up the connection between the branch line 11 and the main sewer. As will be readily apparent to the skilled addressee, the diameter of the reaming tool 20 is greater than the internal diameter of the branch line 11.

Figure 7:
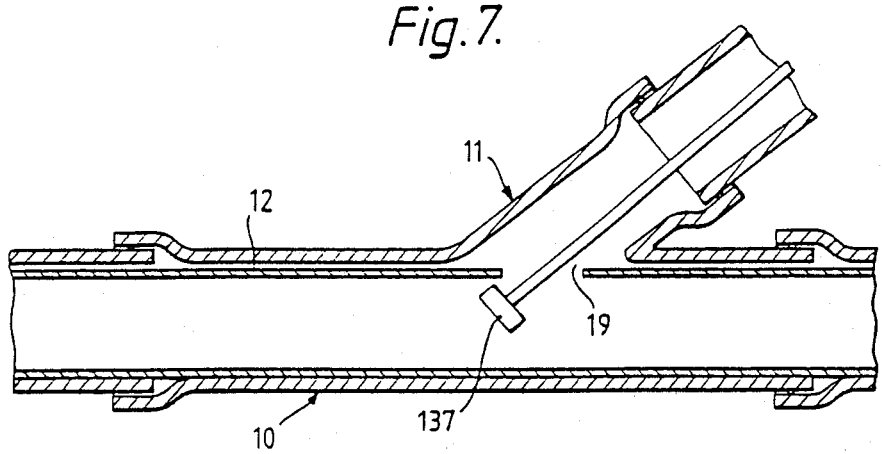
FIG. 7 is a sectional side view of the main sewer and branch line showing the cutting of the pilot hole before the grouting of the liner in the second preferred method of the present invention.
Figure 8:
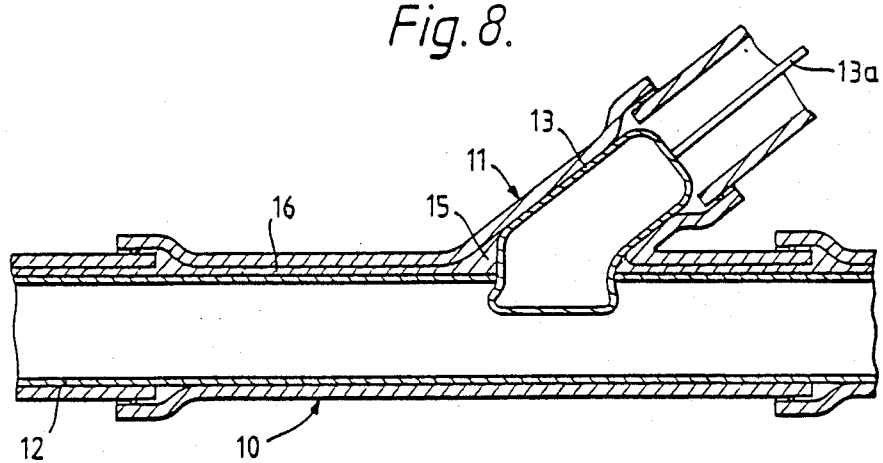
FIG. 8 is a similar view after the liner has been grouted.
Figure 9:
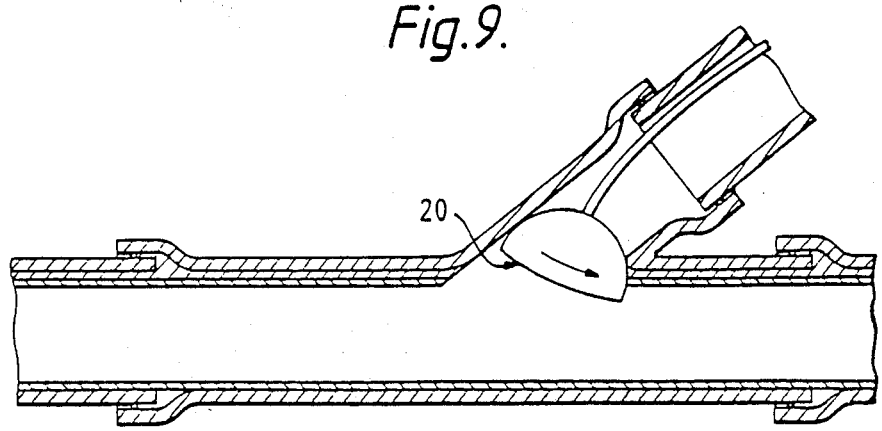
FIG. 9 is a similar view of the reaming out of the connection between the main sewer and the branch line.

Referring now to FIGS. 7 to 9, an alternative method of reinstating the branch line 11 may be employed. After the liner 12 has been placed in the main sewer 10, and before the grouting is effected, a pilot hole 19 is cut in the liner 12 using one of the cutting tools 117, 217 (FIGS. 4 and 5) or an electrically heated cutter 137 fed down the branch line 11.

The inflatible plug 13 is passed down the branch line 11 and extended through the pilot hole 19 into the liner 12 and is inflated via the pipe 13a. This seals the connection of the branch line 11 to the liner 12. Grout 16 is then pumped into the cavity between the liner 12 and the main sewer 10 and fills the cavity at the junction of the main sewer 10 and branch line 11.

When the grout has at least initially set, the inflatible plug 13 is deflated and withdrawn via the branch line 11.

The flexible drive 18 is fed down the branch line 11 through pilot hole 19 and along the liner 12 to the nearest manhole. The reaming tool 20 is fitted to the flexible drive 18, which is then withdrawn to bring the reaming tool 20 to the junction. When the grout 15 at the junction has set sufficiently, the pilot hole 19 is opened up, using the reaming tool, to reinstate the branch line 11 as hereinbefore described.

It will be readily apparent to the skilled addressee that the method can be applied to water and other pipes which may be relined and the methods of reinstatement may be applied to reinstating branch lines 11 connected to main sewers or pipes 10 when the latter have been relined by other relining methods.

Various changes and modifications may be made to the embodiments described without departing from the present invention.

We claim:

1. A method for the reinstatement of lateral branch connections in relined sewers or pipes including the steps of:

sealing the connection of the lateral branch to the sewer or pipe before a liner has been grouted in the sewer or pipe;

injecting grout into the area at the connection and inwardly of the seal, and into the area between the liner and the pipe;

removing the seal after the liner has been grouted in the sewer or pipe at the connection and the grout has at least initially set;

letting the grout fully set;

cutting out a pilot hole, aligned with the lateral branch, through the grout and the liner in the sewer or pipe with a first cutting tool fed down the lateral branch; and cutting out the grout and the liner with a second cutting tool, fed towards the lateral branch from the sewer or pipe, to open the pilot hole to substantially the diameter of the lateral branch to reinstate the connection.

2. A method according to claim 1 wherein:

the lateral branch is sealed from the sewer or pipe by an inflatible plug inserted down the lateral branch to the top of the liner before the grout is pumped into the sewer or pipe.

3. A method according to claim 2 wherein:

grout is pumped through a hollow rod down the lateral branch to seal the junction of the lateral branch with the sewer or pipe, the grout being allowed to set before grout is pumped between the liner and the sewer or pipe.

4. A method according to claim 1 wherein:

the first cutting tool is driven by a flexible drive fed down the lateral branch.

5. A method according to claim 4 wherein:

the second cutting tool is a reaming tool fitted to the flexible drive within the liner and the reaming tool is pulled into the junction of the lateral branch and the sewer or pipe to open up the pilot hole to reinstate the branch line.

* * * * *